United States Patent
Kim et al.

(10) Patent No.: US 6,172,993 B1
(45) Date of Patent: Jan. 9, 2001

(54) FRAME SYNCHRONIZATION METHOD AND APPARATUS FOR USE IN DIGITAL COMMUNICATION SYSTEM UTILIZING OFDM METHOD

(75) Inventors: Young-Sang Kim, Soeul (KR); Francois Langinieux, Metz (FR)

(73) Assignee: Daewoo Electronics Co., Ltd., Seoul (KR)

( * ) Notice: Under 35 U.S.C. 154(b), the term of this patent shall be extended for 0 days.

(21) Appl. No.: 08/982,268

(22) Filed: Dec. 1, 1997

(30) Foreign Application Priority Data

Dec. 28, 1996 (KR) .................................................. 96-75562

(51) Int. Cl.$^7$ .................................................. H04J 3/06
(52) U.S. Cl. ........................................... 370/516; 375/354
(58) Field of Search .................................... 370/509, 510, 370/511, 512, 516, 491, 492; 375/232, 235, 354, 366, 364; 348/425.4, 500, 501, 507, 513

(56) References Cited

U.S. PATENT DOCUMENTS

| | | | |
|---|---|---|---|
| 5,371,548 | * 12/1994 | Williams | 348/478 |
| 5,444,697 | * 8/1995 | Leung et al. | 370/207 |
| 5,574,752 | * 11/1996 | Juri | 375/354 |
| 5,682,376 | * 10/1997 | Hayashino et al. | 370/206 |
| 5,726,973 | * 3/1998 | Isaksson | 370/203 |
| 5,812,523 | * 9/1998 | Isaksson et al. | 370/208 |
| 5,963,592 | * 10/1999 | Kim | 375/232 |
| 5,970,397 | * 10/1999 | Klank et al. | 455/139 |
| 6,091,702 | * 7/2000 | Saiki | 370/203 |

FOREIGN PATENT DOCUMENTS

| | | |
|---|---|---|
| 0 653 858 | 5/1995 | (EP) . |
| 0 683 576 | 11/1995 | (EP) . |
| 2 307 155 | 5/1997 | (GB) . |
| 95/05042 | 2/1995 | (WO) . |
| 96/02991 | 2/1996 | (WO) . |
| 97/26742 | 7/1997 | (WO) . |
| 97/41672 | 11/1997 | (WO) . |

\* cited by examiner

*Primary Examiner*—Chau Nguyen
*Assistant Examiner*—Chiho Andrew Lee
(74) *Attorney, Agent, or Firm*—Pillsbury Madison & Sutro LLP

(57) ABSTRACT

A frame synchronization method and apparatus for use in a digital communication system utilizing OFDM method are disclosed. The frame synchronization apparatus comprises a phase calculator for calculating phase values of TPS pilots within a symbol according to in-phase and quadrature-phase channel signals received from a transmitting side; a D-BPSK demodulator for performing D-BPSK demodulation for the phase values of TPS pilots supplied from the phase calculator and outputting the TPS pilots within the demodulated symbol; a control signal generator for comparing the demodulated TPS pilots with each other and outputting a control signal according to the compared result; and frame synchronization unit for confirming a sync word position according to the control signal supplied from the control signal generator and outputting a frame sync signal. Hence, frame synchronization can be achieved by using the synchronization word inverted at each frame in one TPS block without the need to increase the size of hardware.

12 Claims, 4 Drawing Sheets

FRAME SYNCHRONIZATION METHOD AND APPARATUS FOR USE IN DIGITAL COMMUNICATION SYSTEM UTILIZING OFDM METHOD

BACKGROUND OF THE INVENTION

1. Field of the Invention

The present invention relates to a receiver in a digital communication system utilizing an Orthogonal Frequency Division Multiplexing (OFDM) method, and more particularly to a method for performing frame synchronization by using characteristics of synchronization word inverted at each frame in a transmission parameter signaling (TPS) block, and an apparatus employing the same.

2. Description of the Prior Art

In a wireless communication channel and digital high-definition TV (HDTV) transmission channel, it is known that an Inter-Symbol Interference (ISI) caused by multi-path fading in a received signal commonly occurs. Particularly, when data for HDTV are transmitted through the channel at high speed, the ISI increases causing errors to be generated during the data recovery at the receiving side. To solve this problem, recently, OFDM method has been proposed as a transmission method for use in the Digital Audio Broadcasting (DAB) and Digital Terrestrial Television Broadcasting (DTTB) standards.

In OFDM method, serially-inputted symbol streams are divided into a predetermined unit block. The divided symbol streams of each unit block are converted into N number of parallel symbols. The N number of parallel symbols are multiplexed and added by using a plurality of subcarriers having different frequencies, respectively, according to Inverse Fast Fourier Transform (IFFT) algorithm. The added data are transmitted via the channel. That is, the N number of parallel symbols are defined as one unit block, and each subcarrier of the unit block has an orthogonal characteristic, which does not have an influence on subchannels. Compared to a conventional single carrier transmission method, OFDM method can reduce the ISI caused by the multi-path fading by maintaining the same symbol transmission rate and increasing symbol period as much as by the number of subchannels (N). Especially, in OFDM method, a guard interval (GI) is inserted between the transmitted symbols to enhance the capability of the ISI reduction, making it possible to realize a simplified structure of channel equalizer. In contrast to a conventional Frequency Division Multiplexing (FDM) type, OFDM method has a characteristic that spectrums of each subchannel are superimposed causing it to have a higher band efficiency. Further, the spectrum has a wave of rectangular shape and electric power is uniformly distributed at each frequency band, which prevents from being affected by the same channel interference. The OFDM method is commonly combined with modulation types such as Pulse Amplitude Modulation (PAM), Frequency Shift Keying (FSK), Phase Shift Keying (PSK), and Quadrature Amplitude Modulation (QAM).

FIGS. 1A to 1B are format diagrams of transmission symbol units of a conventional OFDM signal. Symbols transmitted from a transmitting side, as shown in FIG. 1A, comprises an useful part and a guard interval. The useful part contains useful OFDM samples, and the guard interval is inserted in front side of the useful part and separates OFDM samples into symbol units. Samples used in the guard interval are copies of samples located in lower portion of the useful part. According to DTTB standard, the size of the useful part is separated into 2K mode and 8K mode by a Fast Fourier Transform (FFT) size. For 2K mode, as shown in FIG. 1B, the size of the useful part is defined by "2048" samples. In addition, the size of the guard interval is separated into ¼, ⅛, ¹⁄₁₆, and ¹⁄₃₂ of the FFT size. In case of ¼ of the FFT size, as shown in FIG. 1B, the size of the guard interval is defined by "512" samples. Here, "2048" is the sum of 1705 useful subcarriers and 343 NULL subcarriers. The guard interval is comprised of copied data from the last parts of the useful part, 1536-th data to 2047-th data (namely, 512 sizes). The guard interval is inserted in the front portion of the useful data. Finally, the size of transmission symbol units is defined by the sum (2560) of the useful part (2048) and the guard interval (512).

Meanwhile, according to DVB standard, an OFDM signal comprises frames having has 68 OFDM symbols, respectively and a super frame comprises four frames. Each frame comprises transmitted data, Continual Pilot Carriers (CPC), and a TPS pilot.

The transmitting side of the OFDM communication system performs IFFT for N number of symbols, defined as one block unit, and transmits it in frame units. The receiving side performs the FFT for the transmitted frame, to recover an original information. Accordingly, when the frames between the transmitting and receiving sides are not synchronized, errors are generated during the recovery of data.

SUMMARY OF THE INVENTION

In view of the foregoing, it is an object of the present invention to provide a frame synchronization method and apparatus for performing frame synchronization by using characteristics of synchronization word inverted at each frame in a transmission parameter signaling (TPS) block, in digital communication system utilizing OFDM method.

In order to achieve the above object, the present invention provides a frame synchronization method for use in a digital communication system utilizing OFDM method, comprising the steps of: a) calculating phase values of TPS pilots within one symbol according to in-phase and quadrature-phase channel signals received from a transmitting side; b) calculating respective phase differences from the phase values of the TPS pilots of previous symbol and the phase values of the TPS pilots of current symbol calculated in the step a); c) performing D-BPSK demodulation for the phase difference obtained in the step b); d) determining whether all the demodulated TPS pilots in the step c) are identical to each other; e) determining whether current position corresponds to a sync word position, when all the demodulated TPS pilots are determined identical to each other, in the step d); and f) counting symbols, when current position corresponds to the sync word position in said step e), and generating a frame sync signal according to the counted value.

In order to achieve the above object, the present invention provides a frame synchronization apparatus for use in a digital communication system utilizing OFDM method, comprising: phase calculation means for calculating phase values of TPS pilot within a symbol according to in-phase and quadrature-phase channel signal received from a transmitting side; D-BPSK demodulating means for performing D-BPSK demodulation for the phase values of TPS pilot supplied from the phase calculation means and outputting TPS pilots within the demodulated symbol; control signal generating means for comparing the demodulated TPS pilots with each other and outputting a control signal according to the comparison result; and frame synchronization means for confirming a sync word position according to the control signal supplied from the control signal generating means and outputting a frame sync signal.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

First, parameters according to two FFT size modes are represented by the following table 1.

TABLE 1

| Parameter | 8K mode | 2K mode |
|---|---|---|
| number of subcarrier k | 6817 | 1705 |
| $k_{min}$ subcarrier | 0 | 0 |
| $k_{max}$ subcarrier | 6816 | 1704 |
| reciprocal number of subcarrier interval (Tu) | 896 µs | 224 µs |
| subcarrier interval (1/Tu) | 1116 Hz | 4464 Hz |
| interval between subcarriers, $k_{min}$ and $k_{max}$ {(k-1)/Tu} | 7.61 Hz | 7.61 Hz |

That is, a symbol period Ts comprises the period Tu corresponding to the reciprocal of the subcarrier interval and a period ΔT corresponding to the guard interval.

Meanwhile, in accordance with an embodiment of the present invention, a frame synchronization between transmitting and receiving sides is performed by using a TPS pilot signal of various pilot signals. The TPS pilot signal is used to transmit an information related to the transmission, for example, a modulation information defined by α value of a QAM constellation pattern, a hierarchy information, a guard interval information, an inner code rate information, a frame number information, and etc., to the receiving side. 17 number of TPS pilots are used when the FFT size is 2K mode, whereas 68 number of TPS pilots are used when the FFT1 size is 8K mode. Subcarrier indexes for the TPS pilot are represented by the table 2.

TABLE 2

| 2K mode | 8K mode |
|---|---|
| 34 50 209 346 413 569 595 688 790 901 1073 1219 1262 1286 1469 1594 1687 | 34 50 209 346 413 569 595 688 790 901 1073 1219 1262 1286 1469 1594 1687 1738 1754 1913 2050 2117 2273 2299 2392 2494 2605 2777 2923 2966 2990 3173 3298 3391 3442 3458 3617 3754 |

TABLE 2-continued

| 2K mode | 8K mode |
|---|---|
| | 3821 3977 4003 4096 4198 4309 4481 4627 4670 4694 4877 5002 5095 5146 5162 5321 5458 5525 5681 5707 5800 5902 6013 6185 6331 6374 6398 6581 6706 6799 |

Figure 1A:
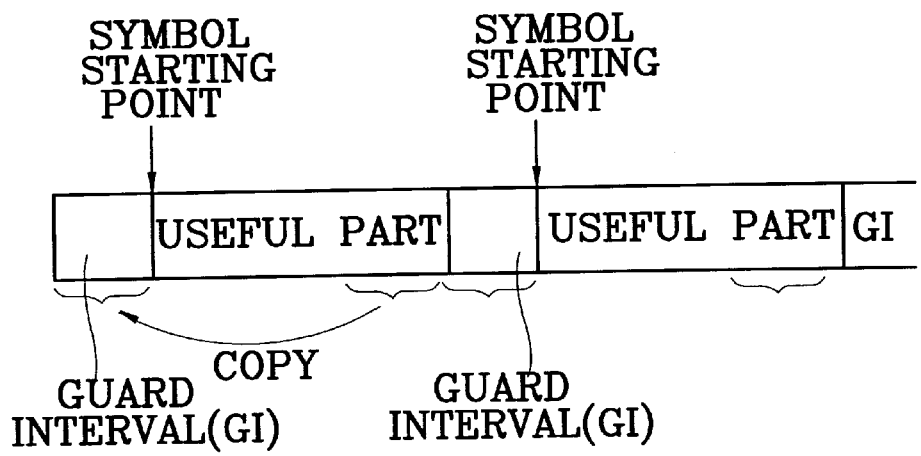
FIGS. 1A and 1B are format diagrams for a transmission symbol of a conventional OFDM signal.
Figure 1B:
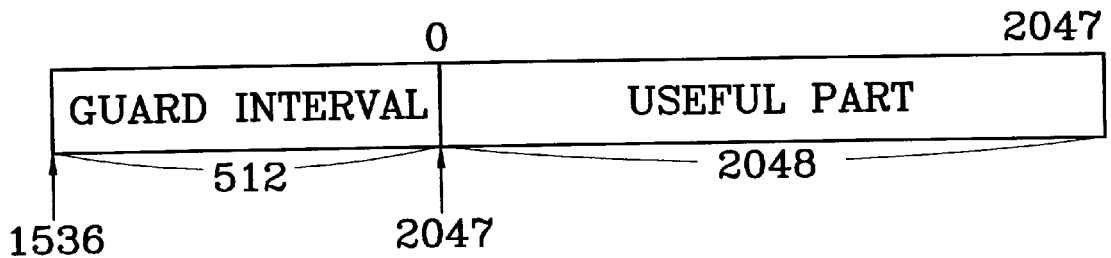
Figure 2:
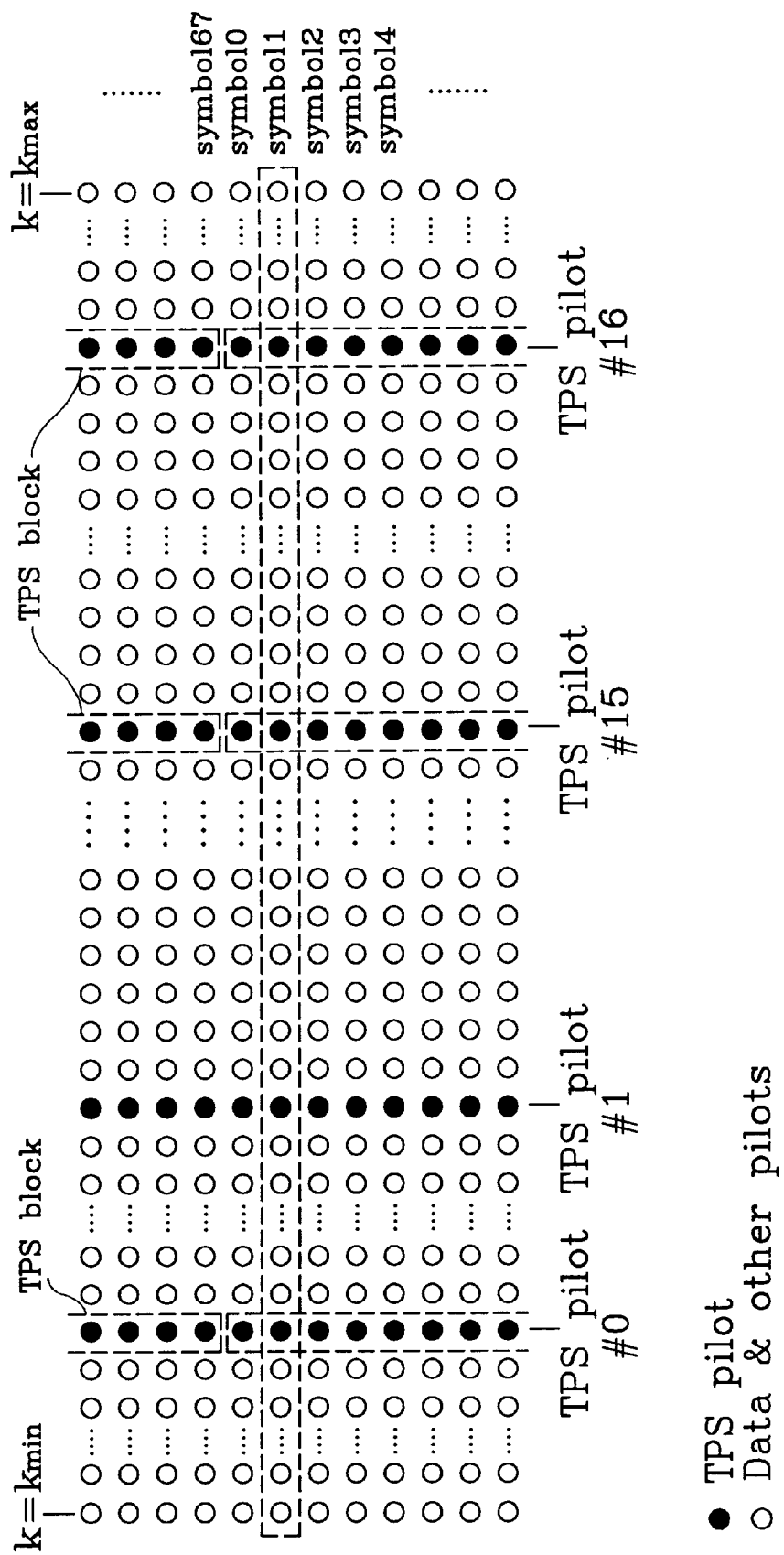
FIG. 2 is a diagram illustrating a frame structure of an OFDM signal according to the present invention.

FIG. 2 shows a frame structure of the OFDM signal in accordance with the preferred embodiment of the present invention. Here, assume 2K mode, namely $k_{min}=0$ and $k_{max}=1704$. The subcarrier number of the TPS pilot, as shown in table 2, is 17 (TPS pilot #0~TPS pilot #16) within a symbol, and all TPS data within a symbol are the same. One frame comprises 68 symbols, and one TPS block for one frame contains TPS pilot of 68-bits.

Here, of one TPS block (68-bits), 1-bit is used for an initialization bit, 16-bits are used for synchronization bits, 37-bits are used for information bits, and 14-bits are used for redundancy bits for error protection. Of 37 information bits, 23-bits are used, the remaining 14-bits are reserved and set as "0". The TPS block is transmitted according to the following table 3.

TABLE 3

| Symbol (bit) number | format | usage/content |
|---|---|---|
| $S_0$ | 0 | initialization |
| $S_1$-$S_{16}$ | 0011010111101110 or 1100101000010001 | synchronization word |
| $S_{17}$-$S_{22}$ | 011000 | length indicator |
| $S_{23}$-$S_{24}$ | Refer to Table 4 | number of frame |
| $S_{25}$-$S_{26}$ | Refer to Table 5 | constellation |
| $S_{27}$-$S_{29}$ | Refer to Table 6 | hierarchy information |
| $S_{30}$-$S_{32}$ | Refer to Table 7 | code rate, HP stream |
| $S_{33}$-$S_{35}$ | Refer to Table 7 | code rate, LP stream |
| $S_{36}$-$S_{37}$ | Refer to Table 8 | guard interval |
| $S_{38}$-$S_{39}$ | Refer to Table 9 | transmission mode |
| $S_{40}$-$S_{53}$ | All set to "0" | reserved |
| $S_{54}$-$S_{57}$ | BCH code | error protection |

Referring to table 3, the bit $S_0$ represents the initialization bit for Differential-Binary Phase Shift Keying (D-BPSK) demodulation. The 16-bits ($S_1$-$S_{16}$) are the synchronization words, and within each super frame, a first frame and a third frame have the synchronization word $S_1$~$S_{16}=$ "0011010111101110" and a second frame and a fourth frame have the synchronization word $S_1$~$S_{16}=$ "1100101000010001". Accordingly, in the embodiment of the present invention, frame synchronization between the transmitting and receiving sides is performed by using the characteristics that the synchronization word is inverted at each frame in TPS blocks. Meanwhile, each super frame contains four frames, and it is separated according to two bits $S_{23}$ and $S_{24}$, like the following table 4.

TABLE 4

| bit $S_{23}$, $S_{24}$ | frame number |
|---|---|
| 00 | the first frame of super frame (0) |
| 01 | the second frame of super frame (1) |
| 10 | the third frame of super frame (2) |
| 11 | the fourth frame of super frame (3) |

The bits $S_{25}$ and $S_{26}$ represent constellation characteristics shown by the following table 5.

TABLE 5

| bits $S_{25}$, $S_{26}$ | constellation characteristic |
| --- | --- |
| 00 | QPSK |
| 01 | 16-QAM |
| 10 | 64-QAM |
| 11 | reserved bit |

The bits $S_{27}$, $S_{28}$, and $S_{29}$ represent hierarchy information shown by the following table 6.

TABLE 6

| bits $S_{27}$, $S_{28}$, $S_{29}$ | α value |
| --- | --- |
| 000 | non-hierarchy |
| 001 | α = 1 |
| 010 | α = 2 |
| 011 | α = 4 |
| 100 | reserved |
| 101 | reserved |
| 110 | reserved |
| 111 | reserved |

Namely, the hierarchy information indicates whether or not the transmission is hierarchical, having α value if it is hierarchical.

Non-hierarchy channel coding and modulation requires a signal corresponding to a code rate. Here, three bits for determining the code rate are represented by the following table 7.

TABLE 7

| bits $S_{30}$, $S_{31}$, $S_{32}$ (HP stream)<br>bits $S_{33}$, $S_{34}$, $S_{35}$ (HP stream) | code rate |
| --- | --- |
| 000 | 1/2 |
| 001 | 2/3 |
| 010 | 3/4 |
| 011 | 5/6 |
| 100 | 7/8 |
| 101 | reserved |
| 110 | reserved |
| 111 | reserved |

The bits $S_{36}$ and $S_{37}$ represent the size of the guard interval shown by the following table 8. In the embodiment of the present invention, assume $S_{36}$, $S_{37}$="11", namely ¼.

TABLE 8

| bits $S_{36}$, $S_{37}$ | the size of the guard interval (Δ/Tu) |
| --- | --- |
| 00 | 1/32 |
| 01 | 1/16 |
| 10 | 1/8 |
| 11 | 1/4 |

The bits $S_{38}$ and $S_{39}$ represent transmission modes shown by the following table 9. In the embodiment of the present invention, assume $S_{38}$, $S_{39}$"00", namely 2K mode.

TABLE 9

| Bits $S_{38}$, $S_{39}$ | transmission mode |
| --- | --- |
| 00 | 2K mode |
| 01 | 8K mode |

TABLE 9-continued

| Bits $S_{38}$, $S_{39}$ | transmission mode |
| --- | --- |
| 10 | reserved |
| 11 | reserved |

Figure 3:
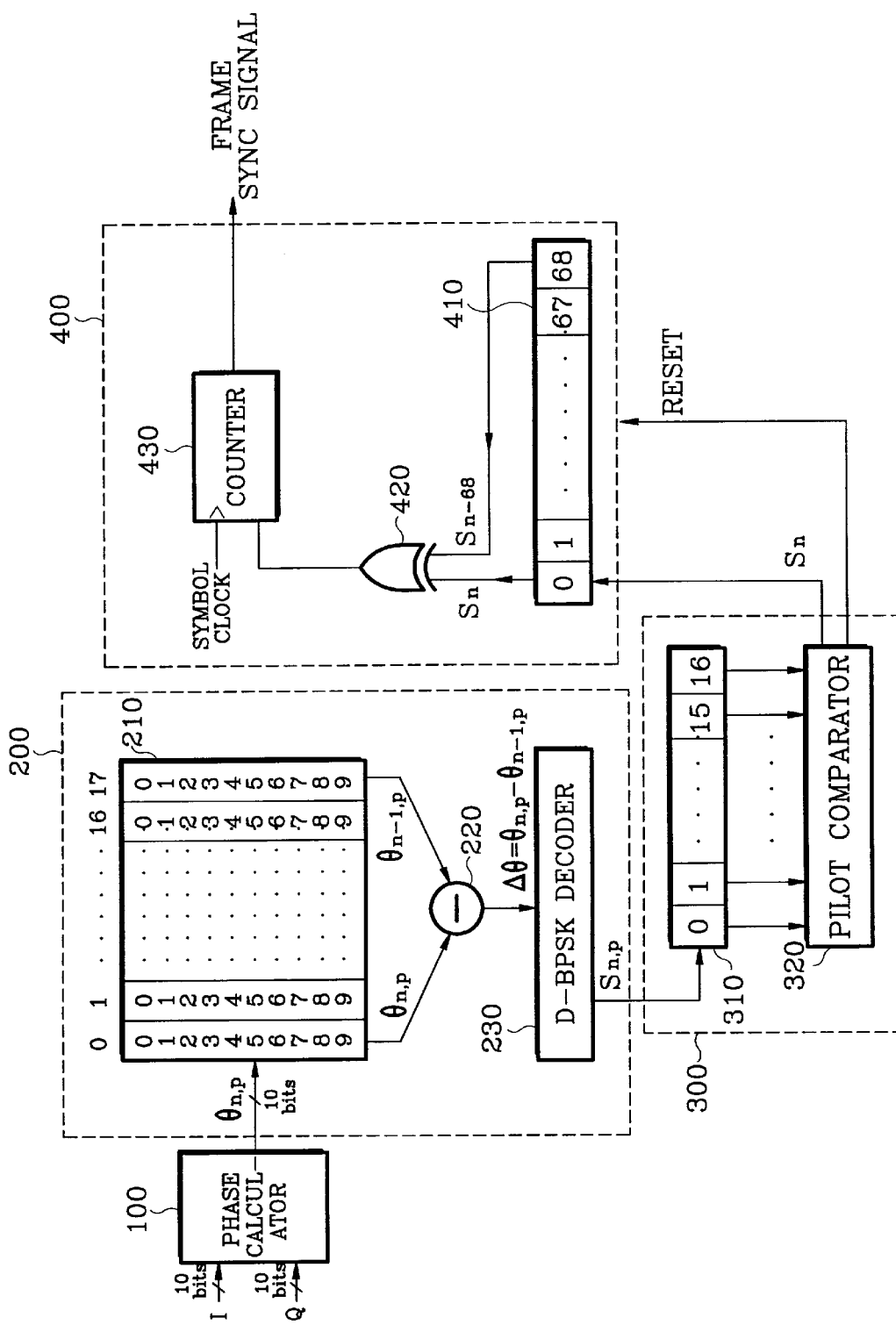
FIG. 3 is a block diagram illustrating a frame synchronization apparatus in a digital communication system utilizing OFDM method in accordance with a preferred embodiment of the present invention.

FIG. 3 is a block diagram illustrating a frame synchronization apparatus in a digital communication system utilizing OFDM method in accordance with a preferred embodiment of the present invention. The frame synchronization apparatus comprises a phase calculator 100, a Differential-Binary Phase Shifted Keying (D-BPSK) demodulator 200, a control signal generator 300, and a frame synchronization unit 400. The D-BPSK demodulator 200 comprises a phase storage unit 210, a subtractor 220, and a D-BPSK decoder 230. The control signal generator 300 comprises a pilot storage unit 310 and a pilot comparator 320. The frame synchronization unit 400 comprises a TPS pilot storage unit 410, a TPS pilot comparator 420, and a counter 430. The symbol $\Theta_{n,p}$ denotes a phase of p-th TPS pilot of current n-th symbol and the symbol $\Theta_{n-1,p}$ denotes a phase of p-th TPS pilot of previous (n−1)th symbol. Further, the symbol $\Delta\Theta_n$ denotes the phase difference of p-th TPS pilot between current n-th symbol and previous (n−1)th symbol; $S_{n,p}$ denotes a D-BPSK decoded TPS bit for p-th TPS pilot of current n-th symbol; and $S_n$ denotes a TPS bit of current n-th symbol.

Referring to FIG. 3, the phase calculator 100 receives in-phase and quadrature-phase channel signals from the transmitting side and calculates the phase $\Theta_{n,p}$ of p-th TPS pilot of current n-th symbol, where p ranges from 1 to 17. At this time, the calculated phase $\Theta_{n,p}$ is stored in a built-in memory, for example, Read Only Memory (ROM) in the form of a look-up table, in advance.

The D-BPSK demodulator 200 performs the D-BPSK demodulation for the phase $\Theta_{n,p}$ of TPS pilot outputted from the phase calculator 100 and outputs the TPS pilot within the demodulated symbol. That is, the phase $\Theta_{n,p}$ of TPS pilot outputted from the phase calculator 100 is stored in the phase storage unit 210. The subtracter 220 subtracts the phase $\Theta_{n-1,p}$ of p-th TPS pilot of previous (n−1)th symbol from the phase $\Theta_{n,p}$ of p-th TPS pilot of current n-th symbol supplied from the phase storage unit 210 and outputs a phase difference $\Delta\Theta_n$. The D-BPSK decoder 230 performs the D-BPSK decoding for the phase difference $\Delta\Theta_n$ supplied from the subtracter 220 and outputs a decoded TPS pilot $S_{n,p}$. Here, the phase storage unit 210 can be implemented by the shift register capable of storing 18 phases, being one more than the corresponding 17 pilots within a symbol. The phase of each TPS pilot is stored in the shift register in unit of 10-bits.

The control signal generator 300 compares the decoded TPS pilots $S_{n,p}$ supplied from the D-BPSK demodulator 200 with each other and outputs a control signal according to the compared result. That is, 17 number of the decoded TPS pilot $S_{n,p}$ outputted from the D-BPSK demodulator 200 are stored in the pilot storage unit 310. The pilot comparator 320 compares 17 number of the decoded TPS pilots $S_{n,p}$ with each other and determines whether all the decoded TPS pilots $S_{n,p}$ are identical to each other. If all the decoded TPS pilots $S_{n,p}$ are identical to each other, the TPS pilot $S_n$ of corresponding symbol is outputted. Otherwise, the reset signal for resetting the frame synchronization unit 400 is outputted. Here, the pilot storage unit 310 can be implemented by the shift register capable of storing 17 pilots within a symbol.

The frame synchronization unit 400 confirms the sync word position (refer to the above table 3) converted at each frame according to the control signal supplied from the control signal generator 300 and outputs a frame sync signal. That is, the TPS pilot of the corresponding n-th symbol outputted from the control signal generator 300 is stored in the TPS pilot storage unit 410. The TPS pilot comparator 420 compares the TPS pilot $S_{n-68}$ of previous frame with the TPS pilot $S_n$ of current frame, confirms the sync word position according to the compared result, and outputs a control signal when the current position corresponds to the sync word position. That is, the TPS pilot comparator 420 outputs "0", which means a sync word position, when the TPS pilot $S_{n-68}$ of previous frame is identical to the TPS pilot $S_n$ of current frame. Otherwise, the TPS pilot comparator 420 outputs "1". The counter 430 counts symbol clocks according to the control signal outputted from the TPS pilot comparator 420 and outputs a frame sync signal. That is, the counter 430 counts the symbol clocks when the TPS pilot comparator 420 outputs "0" and finally outputs the counted value "16". Here, the TPS pilot storage unit 410 can be implemented by a shift register capable of storing 69 TPS pilots, being one more than corresponding 68 symbols within a frame. Also, the TPS pilot comparator 420 can be implemented by an exclusive OR gate and the counter 430 can be implemented by a 4 bits counter to count the sync word of 16 bits (refer to the above table 3) converted at each frame.

Figure 4:
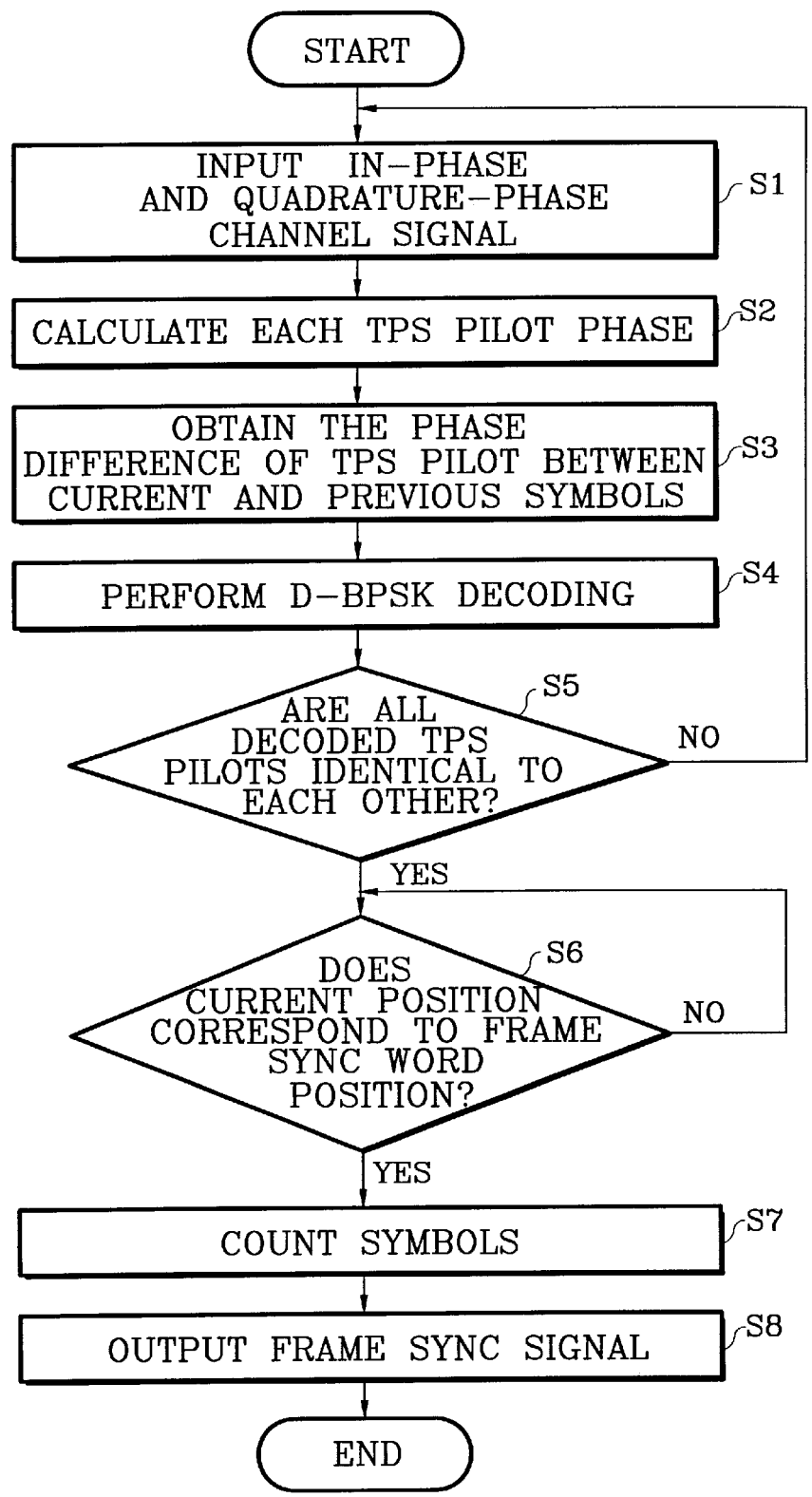
FIG. 4 is a flowchart illustrating a frame synchronization method in a digital communication system utilizing OFDM method in accordance with the present invention.

FIG. 4 is a flowchart illustrating a frame synchronization method in a digital communication system utilizing OFDM method in accordance with the present invention.

Referring to FIG. 4, in the step S1, in-phase and quadrature-phase channel signals are inputted. In the step S2, the phase of the TPS pilot according to the in-phase and quadrature-phase channel signal inputted in the step S1 is calculated. In the step S3, the phase difference is obtained from the phase of the TPS pilot of previous symbol and the phase of the TPS pilot of current symbol calculated in the step S2. In the step S4, the phase difference obtained in the step S3 is demodulated by D-BPSK. In the step S5, it is determined whether all the decoded TPS pilots $S_{n,p}$ are identical to each other. If all the decoded TPS pilots $S_{n,p}$ are not identical to each other, the process returns to the step S1. Otherwise, it is determined whether the current position corresponds to the sync word position in the step S6. In the step S7, when the current position corresponds to the sync word position in the step S6, the number of symbols is counted and the frame sync signal is outputted in the step S8.

In the embodiment of the present invention, the operation of the present invention has been described with regard to the case of the 2K FFT size mode. Additionally, the application of the embodiment can be applied to the 8K FTT size mode.

As described above, the frame synchronization method and apparatus of the present invention can perform frame synchronization by using the synchronization word inverted at each frame in one TPS block without the need to increase its hardware.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A frame synchronization method for use in a digital communication system utilizing OFDM method, comprising the steps of:
    a) calculating phase values of TPS pilots within a symbol according to in-phase and quadrature-phase channel signals received from a transmitting side;
    b) calculating phase differences from the phase values of the TPS pilots of previous symbol and the respective phase values of the TPS pilots of current symbol calculated in said step a);
    c) performing D-BPSK demodulation for the phase difference obtained in said step b);
    d) determining whether all the demodulated TPS pilots in said step c) are identical to each other;
    e) determining whether current position corresponds to a sync word position, when all the demodulated TPS pilots are determined identical to each other, in said step d);
and
    f) counting symbols, when current position corresponds to the sync word position in said step e), and generating a frame sync signal according to the counted value.

2. A frame synchronization apparatus for use in a digital communication system utilizing OFDM method, comprising:
    phase calculation means for calculating phase values of TPS pilots within a symbol according to in-phase and quadrature-phase channel signals received from a transmitting side;
    D-BPSK demodulating means for performing D-BPSK demodulation for the phase values of the TPS pilots supplied from said phase calculation means and outputting the TPS pilots within the demodulated symbol;
    control signal generating means for comparing the demodulated TPS pilots with each other and outputting a control signal according to the compared result; and
    frame synchronization means for confirming a sync word position according to the control signal supplied from said control signal generating means and outputting a frame sync signal.

3. The frame synchronization apparatus of claim 2, wherein said phase calculating means is implemented by a memory in which the phase values of the TPS pilots corresponding to the in-phase and quadrature-phase channel signals are stored in the form of a look-up table.

4. The frame synchronization apparatus of claim 2, wherein said D-BPSK demodulating means comprises;
    a phase storage unit for storing the phase values of the TPS pilots outputted from said phase calculating means;
    a subtracter for subtracting the phase values of the TPS pilots of previous symbol from the respective phase values of the TPS pilots of current symbol supplied from said phase storage unit and outputting phase differences; and
    a D-BPSK decoder for performing D-BPSK decoding for the phase difference supplied from said subtracter and outputting a decoded TPS pilot.

5. The frame synchronization apparatus of claim 4, wherein said phase storage unit is implemented by a shift register for storing number of phases being one more than corresponding number of pilots within one symbol.

6. The frame synchronization apparatus of claim 2, wherein said control signal generating means comprises:

a pilot storage unit for storing the decoded TPS pilots outputted from said D-BPSK demodulating means; and a pilot comparator for comparing the decoded TPS pilots with each other to determine whether all the decoded TPS pilots are identical to each other and generating a control signal according to the compared result.

7. The frame synchronization apparatus of claim 6, wherein the control signal outputted from said pilot comparator resets said frame synchronization means when all the decoded TPS pilots are not identical to each other.

8. The frame synchronization apparatus of claim 6, wherein said pilot storage unit is implemented by a shift register for storing number of pilots within one symbol.

9. The frame synchronization apparatus of claim 2, wherein said frame synchronization means comprises:

a TPS pilot storage unit for storing the TPS pilot of the corresponding symbol outputted from said pilot comparing means;

a TPS pilot comparator for comparing the TPS pilots of previous frame with the respective TPS pilots of current frame, confirming the sync word position according to the compared result, and outputting a control signal when the current position corresponds to the sync word position; and counting means for counting symbol clocks according the control signal outputted from said TPS pilot comparator and outputting a frame sync signal according to the counted value.

10. The frame synchronization apparatus of claim 9, wherein said TPS pilot storage unit is implemented by a shift register for storing number of TPS pilots being one more than corresponding number of symbols within one frame.

11. The frame synchronization apparatus of claim 9, wherein said TPS pilot comparator is implemented by an exclusive OR gate.

12. The frame synchronization apparatus of claim 9, wherein said counting means is implemented by a 4-bit counter.

* * * * *